US010243933B2

(12) United States Patent
Hua et al.

(10) Patent No.: US 10,243,933 B2
(45) Date of Patent: *Mar. 26, 2019

(54) DATA PROCESSING METHOD AND APPARATUS

(71) Applicant: HUAWEI TECHNOLOGIES CO., LTD., Shenzhen, Guangdong (CN)

(72) Inventors: Zhichao Hua, Shanghai (CN); Yubin Xia, Shanghai (CN); Haibo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,148

(22) Filed: Sep. 11, 2017

(65) Prior Publication Data
US 2017/0374040 A1     Dec. 28, 2017

Related U.S. Application Data

(63) Continuation of application No. 14/808,332, filed on Jul. 24, 2015, now Pat. No. 9,762,555, which is a
(Continued)

(30) Foreign Application Priority Data

Jul. 25, 2014 (CN) .......................... 2014 1 0361410

(51) Int. Cl.
*H04L 29/06* (2006.01)
*G06F 21/33* (2013.01)
(Continued)

(52) U.S. Cl.
CPC ........ *H04L 63/0435* (2013.01); *G06F 21/335* (2013.01); *G06F 21/42* (2013.01);
(Continued)

(58) Field of Classification Search
CPC ...................................................... G06F 21/42
(Continued)

(56) References Cited

U.S. PATENT DOCUMENTS

| | | | | |
|---|---|---|---|---|
| 7,028,149 B2 * | 4/2006 | Grawrock | ............... | G06F 21/00 365/189.12 |
| 8,655,966 B1 | 2/2014 | Raj et al. | | |

(Continued)

FOREIGN PATENT DOCUMENTS

| | | |
|---|---|---|
| CN | 1639666 A | 7/2005 |
| CN | 201699728 U | 1/2011 |

(Continued)

OTHER PUBLICATIONS

Xia, Y. et al., "TinMan: Eliminating Confidential Mobile Data Exposure with Security Oriented Offloading," EuroSys '15, Proceedings of the Tenth European Conference on Computer Systems, May 11, 2015, 16 pages.

(Continued)

*Primary Examiner* — Khalil Naghdali
(74) *Attorney, Agent, or Firm* — David William Roe

(57) ABSTRACT

A data processing method and apparatus, where the method includes acquiring a first network data packet that is sent by a target application that runs in an untrusted execution domain, where the first network data packet includes a first identifier; acquiring, in a trusted execution domain, first data corresponding to the first identifier; generating, in the trusted execution domain, a second network data packet according to the first data and the first network data packet; performing, in the trusted execution domain, encryption on the second network data packet by using a first session key to acquire an encrypted second network data packet; and sending the encrypted second network data packet to the target server. The data processing method and apparatus in
(Continued)

the embodiments of the present invention can effectively prevent an attacker from stealing data.

8 Claims, 5 Drawing Sheets

Related U.S. Application Data continuation of application No. PCT/CN2014/095294, filed on Dec. 29, 2014.

(51) Int. Cl.
*G06F 21/42* (2013.01)
*H04L 9/32* (2006.01)
*H04L 9/08* (2006.01)

(52) U.S. Cl.
CPC ...... *H04L 63/0471* (2013.01); *H04L 63/0485* (2013.01); *H04L 63/0823* (2013.01); *H04L 63/0884* (2013.01); *G06F 2221/2113* (2013.01); *H04L 9/0844* (2013.01); *H04L 9/3265* (2013.01); *H04L 63/168* (2013.01); *H04L 2463/062* (2013.01)

(58) Field of Classification Search
USPC ........................................................ 713/151
See application file for complete search history.

(56) References Cited

U.S. PATENT DOCUMENTS

| | | | |
|---|---|---|---|
| 8,769,302 | B2 | 7/2014 | Mittelstadt et al. |
| 8,839,004 | B1 | 9/2014 | Bennett et al. |
| 2003/0115342 | A1 | 6/2003 | Lortz |
| 2003/0172214 | A1 | 9/2003 | Moyer et al. |
| 2004/0098485 | A1* | 5/2004 | Larson .............. H04L 29/12066 709/227 |
| 2008/0091604 | A1 | 4/2008 | Wary |
| 2008/0282342 | A1 | 11/2008 | Hatakeyama |
| 2011/0083169 | A1 | 4/2011 | Moeller et al. |
| 2011/0145418 | A1 | 6/2011 | Pratt et al. |
| 2011/0202755 | A1* | 8/2011 | Orsini .................. H04L 63/029 713/151 |
| 2011/0264905 | A1* | 10/2011 | Ovsiannikov ..... H04L 29/08792 713/151 |
| 2012/0110321 | A1 | 5/2012 | Splitz et al. |
| 2013/0086380 | A1 | 4/2013 | Krishnaswamy et al. |
| 2013/0227668 | A1* | 8/2013 | Mocanu ................. G06F 21/41 726/8 |
| 2013/0301830 | A1 | 11/2013 | Bar-El et al. |
| 2014/0115660 | A1 | 4/2014 | Chinta |
| 2015/0256341 | A1 | 9/2015 | Ye et al. |

FOREIGN PATENT DOCUMENTS

| | | |
|---|---|---|
| CN | 102763098 A | 10/2012 |
| CN | 103020538 A | 4/2013 |
| CN | 103139221 A | 6/2013 |
| CN | 103139366 A | 6/2013 |
| CN | 103262024 A | 8/2013 |
| CN | 103532927 A | 1/2014 |
| CN | 103843303 A | 6/2014 |
| CN | 103856477 A | 6/2014 |
| EP | 2498529 A1 | 9/2012 |
| JP | 2001251297 A | 9/2001 |
| JP | 2010519657 A | 6/2010 |
| WO | 2012167352 A1 | 12/2012 |

OTHER PUBLICATIONS

Tang, Y. et al., "CleanOS: Limiting Mobile Data Exposure with Idle Eviction," 10th USENIX Symposium on Operating Systems Design and Implementation, OSDI '12, 2012, 15 pages.

Seifert, J. et al., "TreasurePhone: Context-Sensitive User Data Protection on Mobile Phones," 8th International Conference, Pervasive 2010, Helsinki, Finland, vol. 6030 of the Series Lecture notes in Computer Science, May 17-20, 2010, 8 pages.

Santos, N. et al., "Using ARM TrustZone to Build a Trusted Language Runtime for Mobile Applications," ASPLOS 14, Mar. 1-5, 2014, 14 pages.

* cited by examiner

DATA PROCESSING METHOD AND APPARATUS

CROSS-REFERENCE TO RELATED APPLICATIONS

This application is a continuation of U.S. patent application Ser. No. 14/808,332, filed on Jul. 24, 2015, which is a continuation of International Application No. PCT/CN2014/095294, filed on Dec. 29, 2014. The International Application claims priority to Chinese Patent Application No. 201410361410.9, filed on Jul. 25, 2014. All of the aforementioned patent applications are hereby incorporated by reference in their entireties.

TECHNICAL FIELD

Embodiments of the present invention relate to the communications field, and in particular, to a data processing method and apparatus.

BACKGROUND

With development of information technologies, personal information security has become a major concern of people. A user may perform a personal data operation by using various intelligent terminals (such as a notebook computer, a smartphone, and a tablet computer). For example, the user may perform an operation on an application program, such as an e-mail, a mobile bank, or a social network; and for ease of use, the user usually saves privacy data such as a login password in the intelligent terminal.

However, some threats also exist in protection of the privacy data by the current intelligent terminal. For example, the privacy data is directly saved in a mobile phone in a plaintext format, which easily causes leakage of the privacy data. Although encryption is performed on the privacy data of the user in the prior art, a key of the encrypted privacy data is coded in a program for version compatibility and ease of user migration, and may be easily obtained by an attacker. As a result, there is a great risk in the privacy data of the user.

Therefore, data security needs to be enhanced urgently in the current intelligent terminal.

SUMMARY

Embodiments of the present invention provide a data processing method and apparatus, which can effectively prevent an attacker from stealing data, thereby improving data security.

According to a first aspect, a data processing method is provided, where the method includes acquiring a first network data packet that is sent by a target application that runs in an untrusted execution domain, where the first network data packet includes a first identifier; acquiring, in a trusted execution domain, first data corresponding to the first identifier, where the first data is data necessary for requesting, by the target application, a service from a target server; generating, in the trusted execution domain, a second network data packet according to the first data and the first network data packet; performing, in the trusted execution domain, encryption on the second network data packet by using a first session key that is determined by pre-negotiation with the target server, to acquire an encrypted second network data packet; and sending the encrypted second network data packet to the target server.

With reference to the first aspect, in a first possible implementation manner of the first aspect, the method further includes receiving a third network data packet that is sent by the target server and is encrypted by using the first session key; decrypting, in the trusted execution domain, the encrypted third network data packet by using the first session key; generating a fourth network data packet according to the third network data packet and the first identifier that corresponds to the first data when it is determined that the decrypted third network data packet includes the first data, where the fourth network data packet does not include the first data; and sending the fourth network data packet to the target application that runs in the untrusted execution domain.

With reference to the first aspect or the first possible implementation manner of the first aspect, in a second possible implementation manner of the first aspect, before the acquiring a first network data packet that is sent by a target application that runs in an untrusted execution domain, the method further includes establishing, in the trusted execution domain, a Secure Sockets Layer (SSL) connection with the target server, and determining the first session key, where the first session key is a session key generated after verification, by using a first root certificate that is pre-stored in the trusted execution domain, on a first certificate of the target server succeeds, where the first certificate is used to certify an identity of the target server.

With reference to the second possible implementation manner of the first aspect, in a third possible implementation manner of the first aspect, before the acquiring a first network data packet that is sent by a target application that runs in an untrusted execution domain, the method further includes generating, in the trusted execution domain, a second certificate according to a second root certificate, where the second certificate has a same universal name as the first certificate, and the second root certificate is pre-stored in the trusted execution domain and the untrusted execution domain; and establishing the SSL connection between the trusted execution domain and the untrusted execution domain and determining a second session key according to the second certificate and the second root certificate, where the second session key is a session key between the trusted execution domain and the untrusted execution domain; and where the acquiring, in a trusted execution domain, a first network data packet that is sent by a target application that runs in an untrusted execution domain includes acquiring the first network data packet that is encrypted by using the second session key; and decrypting, in the trusted execution domain, the encrypted first network data packet by using the second session key.

With reference to the third possible implementation manner of the first aspect, in a fourth possible implementation manner of the first aspect, the establishing the SSL connection between the trusted execution domain and the untrusted execution domain and determining a second session key according to the second certificate and the second root certificate includes acquiring the second certificate that is generated in the trusted execution domain; verifying, in the untrusted execution domain, the second certificate according to the second root certificate; generating the second session key when the verification succeeds, and encrypting the second session key by using a public key of the second certificate; and decrypting, in the trusted execution domain, the encrypted second session key by using a private key of the second certificate, to obtain the second session key.

With reference to the first aspect and any one possible implementation manner of the first to the fourth possible implementation manners of the first aspect, in a fifth possible implementation manner of the first aspect, the sending the encrypted second network data packet to the target server includes transferring the encrypted second network data packet to the untrusted execution domain by using a shared memory; and sending, in the untrusted execution domain, the encrypted second network data packet to the target server.

According to a second aspect, a data processing apparatus is provided, where the apparatus includes a first acquiring module configured to acquire a first network data packet that is sent by a target application that runs in an untrusted execution domain, where the first network data packet includes a first identifier; a second acquiring module configured to acquire, in a trusted execution domain, first data corresponding to the first identifier in the first network data packet that is acquired by the first acquiring module, where the first data is data necessary for requesting, by the target application, a service from a target server; a first generating module configured to generate, in the trusted execution domain, a second network data packet according to the first network data packet and the first data that is acquired by the second acquiring module; an encrypting module configured to perform, in the trusted execution domain and by using a first session key that is determined by pre-negotiation with the target server, encryption on the second network data packet that is generated by the first generating module, to acquire an encrypted second network data packet; and a first sending module configured to send the encrypted second network data packet that is acquired by the encrypting module to the target server.

With reference to the second aspect, in a first possible implementation manner of the second aspect, the apparatus further includes a receiving module configured to receive a third network data packet that is sent by the target server and is encrypted by using the first session key; a processing module configured to decrypt, in the trusted execution domain and by using the first session key, the encrypted third network data packet that is received by the receiving module; generate a fourth network data packet according to the third network data packet and the first identifier that corresponds to the first data when it is determined that the decrypted third network data packet includes the first data, where the fourth network data packet does not include the first data; and a second sending module configured to send the fourth network data packet that is generated by the processing module to the target application that runs in the untrusted execution domain.

With reference to the second aspect or the first possible implementation manner of the second aspect, in a second possible implementation manner of the second aspect, the apparatus further includes a first establishing module configured to establish, in the trusted execution domain, an SSL connection with the target server before the first acquiring module acquires the first network data packet that is sent by the target application that runs in the untrusted execution domain, and determine the first session key, where the first session key is a session key generated after verification, by using a first root certificate that is pre-stored in the trusted execution domain, on a first certificate of the target server succeeds, where the first certificate is used to certify an identity of the target server.

With reference to the second possible implementation manner of the second aspect, in a third possible implementation manner of the second aspect, the apparatus further includes a second generating module configured to generate, in the trusted execution domain, a second certificate according to a second root certificate before the first acquiring module acquires the first network data packet that is sent by the target application that runs in the untrusted execution domain, where the second certificate has a same universal name as the first certificate, and the second root certificate is pre-stored in the trusted execution domain and the untrusted execution domain; and a second establishing module configured to establish, according to the second root certificate and the second certificate that is generated by the second generating module, the SSL connection between the trusted execution domain and the untrusted execution domain, and determine a second session key, where the second session key is a session key between the trusted execution domain and the untrusted execution domain; the first acquiring module includes a first acquiring unit configured to acquire the first network data packet that is encrypted by using the second session key; and a decrypting unit configured to decrypt, in the trusted execution domain and by using the second session key, the encrypted first network data packet that is acquired by the first acquiring unit.

With reference to the third possible implementation manner of the second aspect, in a fourth possible implementation manner of the second aspect, the second establishing module includes a second acquiring unit configured to acquire the second certificate that is generated in the trusted execution domain; a processing unit configured to verify, in the untrusted execution domain and according to the second root certificate, the second certificate that is acquired by the second acquiring unit; generate the second session key when the verification succeeds, and encrypt the second session key by using a public key of the second certificate; and a decrypting unit configured to decrypt, in the trusted execution domain and by using a private key of the second certificate, the second session key that is encrypted by the processing unit, to obtain the second session key.

With reference to the second aspect and any one possible implementation manner of the first to the fourth possible implementation manners of the second aspect, in a fifth possible implementation manner of the second aspect, the first sending module includes a transferring unit configured to transfer the encrypted second network data packet to the untrusted execution domain by using a shared memory; and a sending unit configured to send, in the untrusted execution domain, the encrypted second network data packet to the target server.

Based on the foregoing technical solutions, with the data processing method and apparatus according to the embodiments of the present invention, data is stored in a trusted execution domain, which effectively prevents, during a process of using the data, data in a plaintext format from appearing in an untrusted execution domain, and can effectively prevent an attacker from stealing the data, thereby improving data security.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
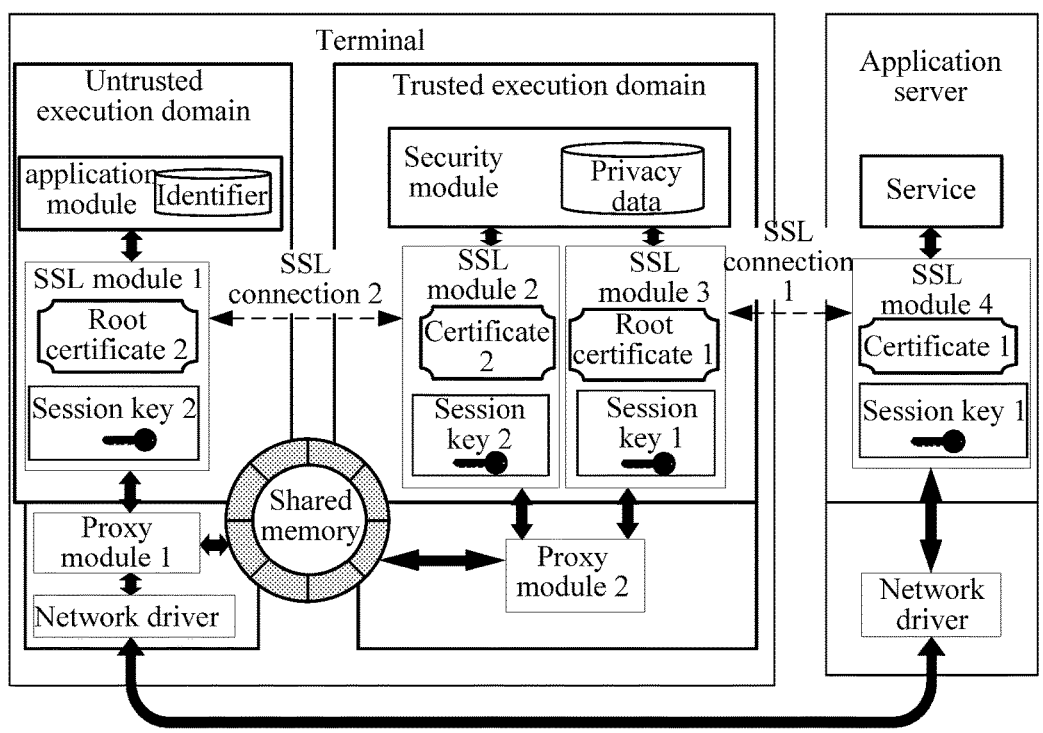
FIG. 1 shows a schematic diagram of an application scenario of a data processing method according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE) system, a frequency division duplex (FDD) system, a time division duplex (TDD) system, and a Universal Mobile Telecommunications System (UMTS).

It should be further understood that, in the embodiments of the present invention, a terminal may also be referred to as a user equipment (UE), a mobile station (MS), a mobile terminal, or the like. The terminal may perform communication with one or more core networks by using a radio access network (RAN). For example, the terminal may be a mobile phone (or may be referred to as a "cellular" phone or a cellphone), a computer having a mobile terminal, or the like. For example, the terminal may further be a portable, pocket-sized, handheld, computer built-in, or vehicle-mounted mobile apparatus, which exchanges voice and/or data with the radio access network. For ease of expression, that a terminal is a mobile phone is used an example for description in the embodiments of the present invention, but the embodiments of the present invention are not limited thereto.

For ease of understanding the embodiments of the present invention, several elements that may be used in description of the embodiments of the present invention are introduced herein first.

1. Untrusted Execution Domain and Trusted Execution Domain:

The untrusted execution domain and the trusted execution domain may be understood as two running environments that run on a same processor, where the untrusted execution domain may further be referred to as a "normal world", such as an environment for running an application, and correspondingly, the trusted execution domain may be referred to as a "secure world". Information or data in the untrusted execution domain may be stolen or damaged by an attacker, that is, security of the information and data in the untrusted execution domain is not high. Compared with the untrusted execution domain, the trusted execution domain can effectively ensure security of information and data, and information or data in the trusted execution domain shall not be acquired or tampered by an attacker because none of applications/system programs in the untrusted execution domain can randomly access/modify the data and information in the trusted execution domain. In addition, hardware and software of a terminal jointly ensure security of the trusted execution domain. For a terminal based on an Advanced RISC Machine (ARM) (advance reduced instruction set computing machine) processor, a TrustZone security extension technology provided by the ARM may be used to design the untrusted execution domain and the trusted execution domain.

2. Security Sockets Layer Communication:

SSL is a universal communication encryption protocol, which can securely and effectively ensure security of communication between a client and a server. Communication based on SSL is divided into two steps the first step is to encrypt communication in an asymmetric encryption manner, to establish an SSL connection between the client and the server. An exemplary procedure can include the client first initiates a connection request to the server; the server may send a certificate that certifies an identity of the server to the client, where the certificate includes some information of the server and a public key for asymmetrical encryption; after verification, by the client, on the identity of the server succeeds, the client generates a session key for symmetric encryption, and then encrypts the session key by using the public key in the certificate of the server, and sends the encrypted session key to the server. The session key is asymmetrically encrypted; therefore, the session key that is encrypted by using the public key can be decrypted only by using a private key of the server (the private key is held by the server only). At this point, the client completes verification on the identity of the server, and securely determines a session key by negotiation with the server. In the second step, on a communication stage, all subsequent communication between the client and the server is encrypted by using the session key.

3. Certificate and Root Certificate:

It can be learned from the foregoing that, during a process of establishing an SSL connection, a server usually provides a certificate that certifies an identity of the server for verification by the client, that is, the certificate is a document that is used to certify the identity of the server. Generally, the certificate includes at least the following three pieces of information.

(1) Public key: There is a public key in the certificate, and only an owner of the certificate shall have a private key corresponding to the public key. In asymmetric encryption, only the corresponding private key can be used to decrypt content that is encrypted by using the public key, and the reverse is also true (only the corresponding public key can be used to decrypt content that is encrypted by using the private key). That is, information that is encrypted by using the public key in the certificate can be decrypted only by the owner of the certificate. Therefore, the public key in the certificate can ensure that, it must be the owner of the certificate that connects to the client (a non-certificate owner does not have the private key corresponding to the public key; therefore, information that is encrypted by the client by using the public key in the certificate cannot be decrypted, and communication with the client cannot be performed).

(2) Universal name: There is a universal name in the certificate. For example, for a server whose domain name is www.google.com, a universal name of a certificate of the server is www.google.com, where the universal name of the certificate can notify a client of an identity of an owner of the certificate, and the client can compare whether the universal name of the certificate is consistent with a domain name of the server to which the client expects to connect.

(3) Signature information: There may further be signature information of a certificate authority in the certificate. A client verifies authenticity of the certificate by using the signature information, because the signature information is information that is encrypted by the certificate authority by using a private key of a corresponding root certificate, where the corresponding root certificate is pre-installed in the client. A client trusts only a certificate that is signed by using a trusted root certificate. For ease of understanding, the following introduces the root certificate.

A root certificate is a certificate (for example, Microsoft Root Authority) that is trusted by a client in advance, and the root certificate is pre-installed in the client (there is also a public key in the root certificate). When signing a certificate for a website, a trusted certificate authority encrypts signature information by using a private key of the root certificate of the trusted certificate authority. As a result, the signature information can be decrypted only by using the public key of the root certificate of the authority, and the signature information can be decrypted by using the public key of the root certificate. Therefore, when a client verifies authenticity of a certificate, public keys of multiple root certificates that are pre-saved may be used in sequence to decrypt signature information in the certificate. Once the signature information in the certificate can be decrypted by using any one of the certificates, it indicates that the certificate is issued by a trusted certificate authority, that is, the certificate is trusted.

It can be learned from the foregoing that, during a communication process based on the SSL protocol, a certificate and a root certificate are two important elements, which are a basis and key for ensuring communication security.

Currently, when some applications (for example, Alipay) of a mobile phone are running, data that closely relates to user privacy (such as a user account, a password, or an identity card number, which is referred to as user privacy data in the following) needs to be sent to an application server to perform an operation such as login or payment. In the prior art, user privacy data is generally stored in an application (equivalent to being stored in an untrusted execution domain), and then the user privacy data and other information are sent together to an application server (such as an Alipay server) to perform an operation. Currently, to ensure security of communication between a mobile phone and a server, the SSL protocol may be used to perform encryption on communication between the mobile phone and the server. For example, the server sends a certificate to the mobile phone according to the SSL protocol, and some root certificates are pre-stored in an untrusted execution domain of the mobile phone; then the mobile phone verifies, by using the root certificates, the certificate that is provided by the server; after the verification succeeds, an encryption key is determined by an application in the mobile phone by negotiation with the server, and the key is used for encryption in subsequent communication.

However, some problems exist in such an architecture. First, user privacy data is saved in an untrusted execution domain of a mobile phone, which provides an attacker with an opportunity of stealing the user privacy data; second, the mobile phone verifies, by using a root certificate in the untrusted execution domain, a certificate that is provided by a server, so the attacker can attack the mobile phone of the user by installing a malicious root certificate in the untrusted execution domain of the mobile phone. Because the mobile phone in which the malicious root certificate is installed cannot distinguish a forged application server, the mobile phone may correspondingly send user privacy data to the forged application server, which greatly reduces security of the user privacy data.

To resolve the foregoing problem, a structure shown in FIG. 1 is proposed in the present invention. First, a terminal (for example, a mobile phone) includes a trusted execution domain and an untrusted execution domain. Different from the prior art, an application module (for example, an application such as Alipay) that runs in the untrusted execution domain no longer saves user privacy data (for example, a payment password of Alipay), but saves an identifier that has a correspondence with the user privacy data to replace the user privacy data; the correspondence and the user privacy data are both stored in the trusted execution domain (for example, as shown in the figure, the privacy data is stored in a security module inside the trusted execution domain). The application module that runs in the untrusted execution domain sends a network data packet that includes the identifier; then the security module inside the trusted execution domain intercepts the network data packet, determines the corresponding user privacy data according to the identifier in the network data packet, replaces the identifier in the network data packet with the user privacy data, and then sends the network data packet that includes the user privacy data to an application server. In this way, security of the user privacy data can be effectively improved, because an attacker who attacks the untrusted execution domain cannot acquire the user privacy data even if the attacker steals the identifier. In addition, different from the prior art, a root certificate (for example, a root certificate 1 in an SSL module 3 shown in FIG. 1) that is used to verify an identity of the application server is no longer stored in the untrusted execution domain, but is stored in the trusted execution domain. In this way, even if an attacker installs a malicious root certificate in the untrusted execution domain, the SSL module 3 in the trusted execution domain can identify a forged application server because data in the trusted execution domain cannot be acquired or tampered by the attacker.

For ease of understating, the following briefly introduces, with reference to FIG. 1, modules in an application scenario according to an embodiment of the present invention. As shown in FIG. 1, a terminal includes an untrusted execution domain and a trusted execution domain, and user privacy data is stored in the trusted execution domain. The untrusted execution domain includes an application module, an SSL module 1, a proxy module 1, and a network driver, and the trusted execution domain includes a security module, an SSL module 2, an SSL module 3, and a proxy module 2. The following briefly introduces the modules and their connection relationships.

The modules in the untrusted execution domain are first introduced.

Application Module:

For example, for an application that runs in the untrusted execution domain, such as Alipay, 126 electronic mail (E-mail) box, or QQ Mail, when the application requests a related service from an application server, some data related to user privacy (such as a payment password or an identity card number of a user) needs to be used. Different from the prior art, in the present invention, an application that runs in the untrusted execution domain no longer saves user privacy data that needs to be used, but saves an identifier that has a correspondence with the user privacy data (as shown in FIG. 1), and the correspondence is pre-saved in the trusted execution domain. In addition, there is no association between the identifier and the user privacy data in view of content. Therefore, an attacker who attacks the untrusted execution domain cannot acquire the user privacy data even if the attacker steals the identifier.

SSL Module 1:

The SSL module 1 in the untrusted execution domain provides an SSL service for the application module, verifies an identity of the application server by using a root certificate (a root certificate 2 shown in FIG. 1) that is stored in the untrusted execution domain, and ensures security of an SSL session. The SSL module 1 verifies whether a network server that performs an SSL session with the SSL module 1 is a network server (for example, an Alipay server) designated by an application (for example, Alipay). The following provides descriptions in detail.

Proxy Module 1:

The proxy module 1 in the untrusted execution domain is responsible for forwarding a network data packet. For a network data packet that is sent from the application module to the application server, the proxy module 1 may forward the network data packet to the trusted execution domain for processing; for a network data packet that is sent from the application server to the untrusted execution domain, the proxy module 1 may also forward the network data packet to the trusted execution domain for processing; for a network data packet that is sent from the trusted execution domain to the application server, the proxy module 1 forwards the network data packet to the network driver, so that the network driver sends the network data packet to the application server.

Network Driver:

The network driver is responsible for sending a network data packet to the application server or receiving a network data packet that is sent by the application server, and the network driver may be, for example, a driver of a network adapter in a mobile phone.

The foregoing introduces the modules in the untrusted execution domain, and the following introduces the modules in the trusted execution domain.

Security Module:

User privacy data is saved in this module, and no malicious program/system in the untrusted execution domain can steal the user privacy data stored in the security module. For example, in this module, all the user privacy data is stored in a mode similar to such a correspondence of "user privacy data+identifier".

SSL Module 3:

As shown in FIG. 1, the SSL module 3 in the trusted execution domain is used to establish an SSL connection (an SSL connection 1 shown in FIG. 1) with a network server, and the root certificate 1 stored in the trusted execution domain is used to verify an identity of the network server and ensures communication security (a session key 1 that is shown in FIG. 1 and is determined by negotiation).

SSL Module 2:

The SSL module 2 is responsible for helping the security module in the trusted execution domain to perform, in replacement of the application server, an SSL connection (an SSL connection 2 shown in FIG. 1) with the application module in the untrusted execution domain.

The application module in the untrusted execution domain may verify, by using the SSL module 1 that is also located in the untrusted execution domain, whether a network server that performs an SSL session with the application module is a network server (for example, an Alipay server) designated by an application (for example, Alipay). In the present invention, the SSL connection is established between the trusted execution domain and the application server. In other words, the SSL connection is established between the security module and the application server. Therefore, the security module needs to establish, in replacement of the application server designated by the application module, the SSL connection with the application module. Therefore, in the trusted execution domain, certificates need to be made for different servers. The certificates are made for the security module, so that the security module can perform, in replacement of the application server, the SSL connection with the application module. The following provides detailed descriptions.

Proxy Module 2:

The proxy module 2 in the trusted execution domain is also responsible for forwarding a network data packet. The proxy module 2 may send, to the security module, a data packet that is forwarded from the proxy module 1 in the untrusted execution domain (the data packet is encrypted and decrypted by the SSL module 2 or the SSL module 3), and send a network data packet that is sent by the security module to the application server, to the proxy module 1 in the untrusted execution domain for processing.

It should be understood that, the network driver shown in FIG. 1 is located in the untrusted execution domain, that is, the terminal performs, in the untrusted execution domain, direct communication with the application server. For example, after being processed in the trusted execution domain, a network data packet further needs to be transferred to the untrusted execution domain and then sent to the application server; therefore, the proxy module 2 needs to send the network data packet that is sent by the security module to the application server, to the proxy module 1 in the untrusted execution domain for processing. Optionally, if the network driver is trusted and secure, the network driver may be set in the trusted execution domain. In other words, the terminal may perform, in the untrusted execution domain, direct communication with the application server. Correspondingly, for the network data packet that is sent by the security module to the application server, the proxy module 2 does not need to forward the network data packet to the proxy module 1 in the untrusted execution domain for processing; instead, the proxy module 2 may directly send the network data packet to the network driver in the trusted execution domain, and the network driver may send the network data packet to the application server.

Shared Memory:

As shown in FIG. 1, to support communication between the trusted execution domain and the untrusted execution domain, there is a shared memory between the two execution domains. In the untrusted execution domain, a data packet that needs to be sent to the trusted execution domain is stored in the shared memory, and the data packet is acquired, in the trusted execution domain, from the shared memory (the reverse is also true), that is, communication between the trusted execution domain and the untrusted execution domain is implemented by using the shared memory.

It should be understood that, the forwarding of the network data packet by the proxy module 1 and proxy module 2, that is, communication between the trusted execution domain and the untrusted execution domain is implemented by using the shared memory.

It should be further understood that, in an actual operation, communication between the trusted execution domain and the untrusted execution domain may further be implemented by using another means, which is not limited in this embodiment of the present invention.

In conclusion, different from a traditional architecture, in the present invention, an application module in an untrusted execution domain merely stores an identifier of user privacy data, and therefore, an attacker can only steal the identifier of the user privacy data, but cannot steal the privacy data. In addition, there is no association between the identifier and the privacy data in view of content; therefore, the attacker cannot reversely derive the user privacy data by using the stolen identifier. In the trusted execution domain, only an identifier in a network data packet that is sent to a trusted application server is replaced with the user privacy data. If it is found that a target server of a network data packet is not a trusted server, no operation is performed on the network data packet, which prevents an attacker from stealing the user privacy data by using a malicious and untrusted server.

It should be understood that an architecture or a scenario shown in FIG. 1 is used to help a person skilled in the art to better understand embodiments of the present invention, but is not intended to limit a scope of the embodiments of the present invention. For example, an identifier that has a correspondence with user privacy data is not necessarily stored in the application module, as long as the identifier is stored in the untrusted execution domain. Likewise, the user privacy data is not necessarily stored in the security module shown in FIG. 1, as long as the user privacy data is stored in the trusted execution domain. In addition, a person skilled in the art certainly can make various equivalent modifications or changes according to a given example of FIG. 1, and such modifications or changes also fall within the protection scope of the embodiments of the present invention.

Figure 2:
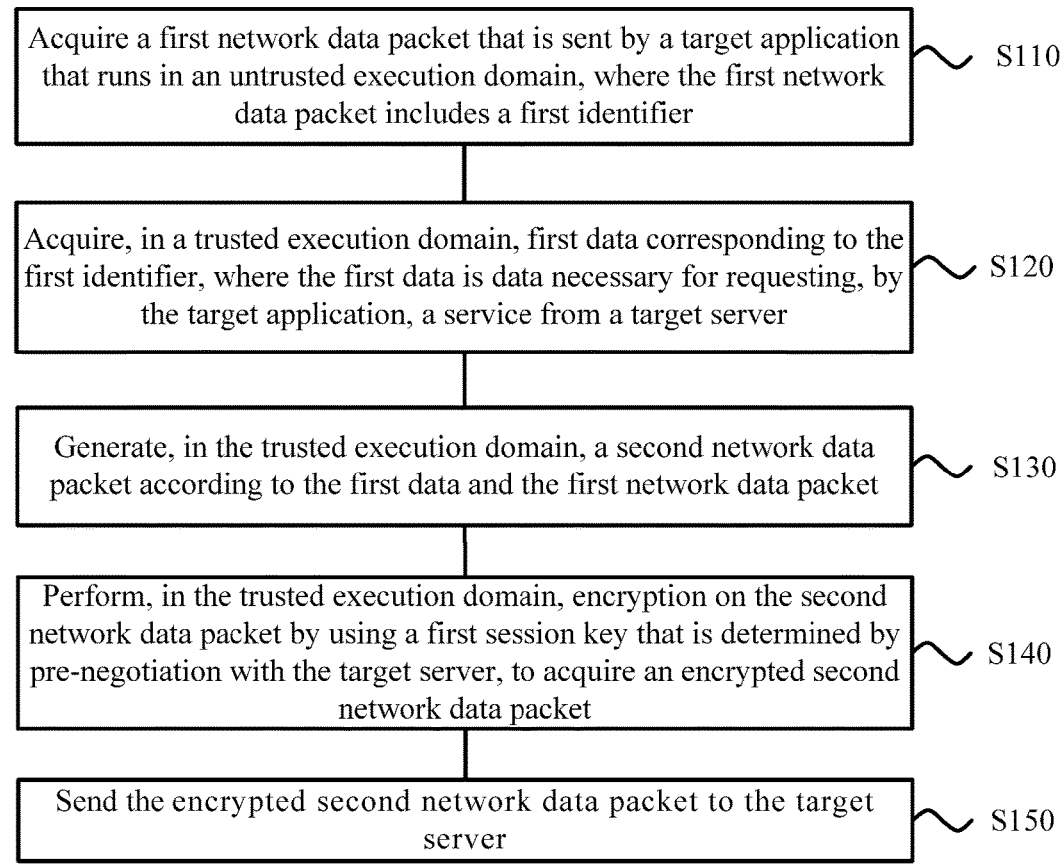
FIG. 2 shows a schematic flowchart of a data processing method according to an embodiment of the present invention.

FIG. 2 shows a schematic flowchart of a data processing method 100 according to an embodiment of the present invention, where the method 100 may be executed by, for example, a terminal, and the terminal includes an untrusted execution domain and a trusted execution domain, for example, the terminal shown in FIG. 1. As shown in FIG. 2, the method includes the following steps.

S110. Acquire a first network data packet that is sent by a target application that runs in an untrusted execution domain, where the first network data packet includes a first identifier.

S120. Acquire, in a trusted execution domain, first data corresponding to the first identifier, where the first data is data necessary for requesting, by the target application, a service from a target server.

S130. Generate, in the trusted execution domain, a second network data packet according to the first data and the first network data packet.

S140. Perform, in the trusted execution domain, encryption on the second network data packet by using a first session key that is determined by pre-negotiation with the target server, to acquire an encrypted second network data packet.

S150. Send the encrypted second network data packet to the target server.

The target application that runs in the untrusted execution domain generates the first network data packet that includes the first identifier, where the first network data packet may be understood as a request data packet for requesting a service from the target server. In the trusted execution domain, the first network data packet is acquired and the first data corresponding to the first identifier in the first network data packet is acquired, where the first data is data necessary for requesting, by the target application, a service from the target server, for example, the user privacy data shown in FIG. 1. There is a correspondence between the first identifier and the first data necessary for requesting a service, and the correspondence is pre-stored in the trusted execution domain. In the trusted execution domain, the first data according to the acquired first identifier and the pre-stored correspondence may be acquired, and the second network data packet that includes the first data is determined in the trusted execution domain according to the acquired first data and the first network data packet. Optionally, the second network data packet may be determined by replacing the first identifier in the first network data packet with the first data. In the trusted execution domain, encryption is performed on the second network data packet according to the first session key (for example, a session key 1 shown in FIG. 1) that is determined by negotiation with the target server. It should be understood that, the first session key is stored in the trusted execution domain and cannot be acquired in the untrusted execution domain, and therefore, a system or program that runs in the untrusted execution domain cannot acquire the first session key, and cannot acquire a plaintext form of the first data, either. The encrypted second network data packet that includes the first data is sent to the target server, so that the target server responds to the request of the target application according to the second network data packet.

Therefore, in the data processing method according to this embodiment of the present invention, data is stored in a trusted execution domain, which effectively prevents, during a process of using the data, data in a plaintext format from appearing in an untrusted execution domain, and can effectively prevent an attacker from stealing the data, thereby improving data security.

It should be understood that, the first data in this embodiment of the present invention is data necessary for requesting, by the target application, a service from the target server. For example, when an Alipay application requests a related service from an Alipay server, it is necessary to provide a user name, a login password or a payment password, and the like for the server, where the first data may be the user name and the login password or the payment password. If the data is stolen by an attacker, it is extremely possible that personal properties or private resources of the user are endangered. It should be understood that, in the present invention, the first data may also be referred to as user privacy data.

It should be further understood that, in addition to the first identifier, the first network data packet may further include other request information, for example, information such as a domain name of the target server, which is not limited in this embodiment of the present invention.

In step S110, the first network data packet that is sent by the target application that runs in the untrusted execution domain is acquired, where the first network data packet includes the first identifier. The first network data packet may be acquired by using a shared memory.

Optionally, in this embodiment of the present invention, the acquiring a first network data packet that is sent by a target application that runs in an untrusted execution domain includes acquiring the first network data packet by using the shared memory.

In the untrusted execution domain, the first network data packet sent by the target application is stored in the shared memory; then the untrusted execution domain is switched to the trusted execution domain; and in the trusted execution domain, the first network data packet is acquired from the shared memory, and then subsequent processing is performed, in the trusted execution domain, on the first network data packet. For example, as shown in FIG. 1, in an untrusted execution domain, a first network data packet that is generated by an application module and includes a first identifier is stored in a shared memory by using a proxy module 1; and in a trusted execution domain, the first network data packet is extracted from the shared memory by using a proxy module 2, and then the first network data packet is sent to another module in the trusted execution domain for subsequent processing.

In step S120, the first data corresponding to the first identifier is acquired in the trusted execution domain. For example, there is a correspondence between the first identifier and the first data necessary for requesting a service, and the correspondence is pre-stored in the trusted execution domain; in the trusted execution domain, the first data determined by the first identifier may be determined according to the correspondence and the first identifier.

It should be understood that, there is a correspondence between the first identifier and the first data, but the first identifier may have no association with the first data in view of content. That is, an attacker who attacks the untrusted execution domain cannot derive or acquire the corresponding first data even if the attacker steals the first identifier, thereby improving security of the first data. The first identifier may be pre-stored in the untrusted execution domain. The first identifier may be stored in the target application. For example, the first identifier may be stored in the application module shown in FIG. 1.

It should be further understood that, the correspondence between the first identifier and the first data may be stored in the trusted execution domain in any storing mode. For example, the correspondence may be stored in a "first identifier+first data" mode, or may be stored in a mode of an index that is established based on the first identifier and the first data, which is not limited in this embodiment of the present invention, as long as the corresponding first data can be acquired in the trusted execution domain according to the first identifier.

In step S130, the second network data packet is generated according to the first data and the first network data packet. It should be understood that the second network data packet includes the first data.

Optionally, in this embodiment of the present invention, the generating, in the trusted execution domain, a second network data packet according to the first data and the first network data packet in step S130 includes replacing the first identifier in the first network data packet with the first data to determine the second network data packet.

It should be understood that, in this embodiment of the present invention, the second network data packet may also be re-generated according to the first data and the first network data packet, which is not limited in this embodiment of the present invention, as long as the second network data packet includes the first data and a service can be requested from the target server that is designated by the target application.

In step S140, encryption is performed on the second network data packet by using the first session key that is determined by pre-negotiation with the target server. It should be understood that, the first session key is a key for performing, in the trusted execution domain, communication with the target server. Before communication is performed, an encrypting and decrypting module in the trusted execution domain and the target server have agreed on the first session key, which is described in detail in the following with reference to FIG. 3.

It should be further understood that, the first session key may be pre-stored in the trusted execution domain, or may be acquired, in the trusted execution domain, from a server at any time, which is not limited in this embodiment of the present invention, as long as it is ensured that a system or program in the untrusted execution domain cannot acquire the first session key.

In step S150, the encrypted second network data packet is sent to the target server. The encrypted second network data packet may be directly sent, in the trusted execution domain, to the target server, or the encrypted second network data packet may be sent to the target server after the trusted execution domain may be switched to the trusted execution domain. It should be understood that, if a network driver that is used to send data to the target server is trusted and secure, that is, the network driver runs in the trusted execution domain, the encrypted second network data packet may be sent, in the trusted execution domain, to the target server; if the network driver is untrusted, that is, the network driver runs in the untrusted execution domain, the encrypted second network data packet is sent, in the untrusted execution domain, to the target server.

Optionally, in this embodiment of the present invention, the sending the encrypted second network data packet to the target server in step S150 includes transferring the encrypted second network data packet to the untrusted execution domain by using the shared memory; and sending, in the untrusted execution domain, the encrypted second network data packet to the target server.

Therefore, in the data processing method according to this embodiment of the present invention, first data is stored in a trusted execution domain, which can improve data security. In addition, when a network data packet that includes the first data is sent to a target server, the first data is encrypted by using a first session key and then encrypted first data is sent, which further improves security of the first data.

In step S140, encryption is performed on the second network data packet by using the first session key that is determined by pre-negotiation with the target server. It should be understood that, the first session key is a key for performing, in the trusted execution domain, communication with the target server. The first session key may be determined by establishing an SSL connection with the target server.

Optionally, in an embodiment, before the acquiring a first network data packet that is sent by a target application that runs in an untrusted execution domain in step S110, the method further includes establishing, in the trusted execution domain, a SSL connection with the target server, and determining the first session key, where the first session key is a session key generated after verification, by using a first root certificate that is pre-stored in the trusted execution domain, on a first certificate of the target server succeeds, where the first certificate is used to certify an identity of the target server.

Figure 3:
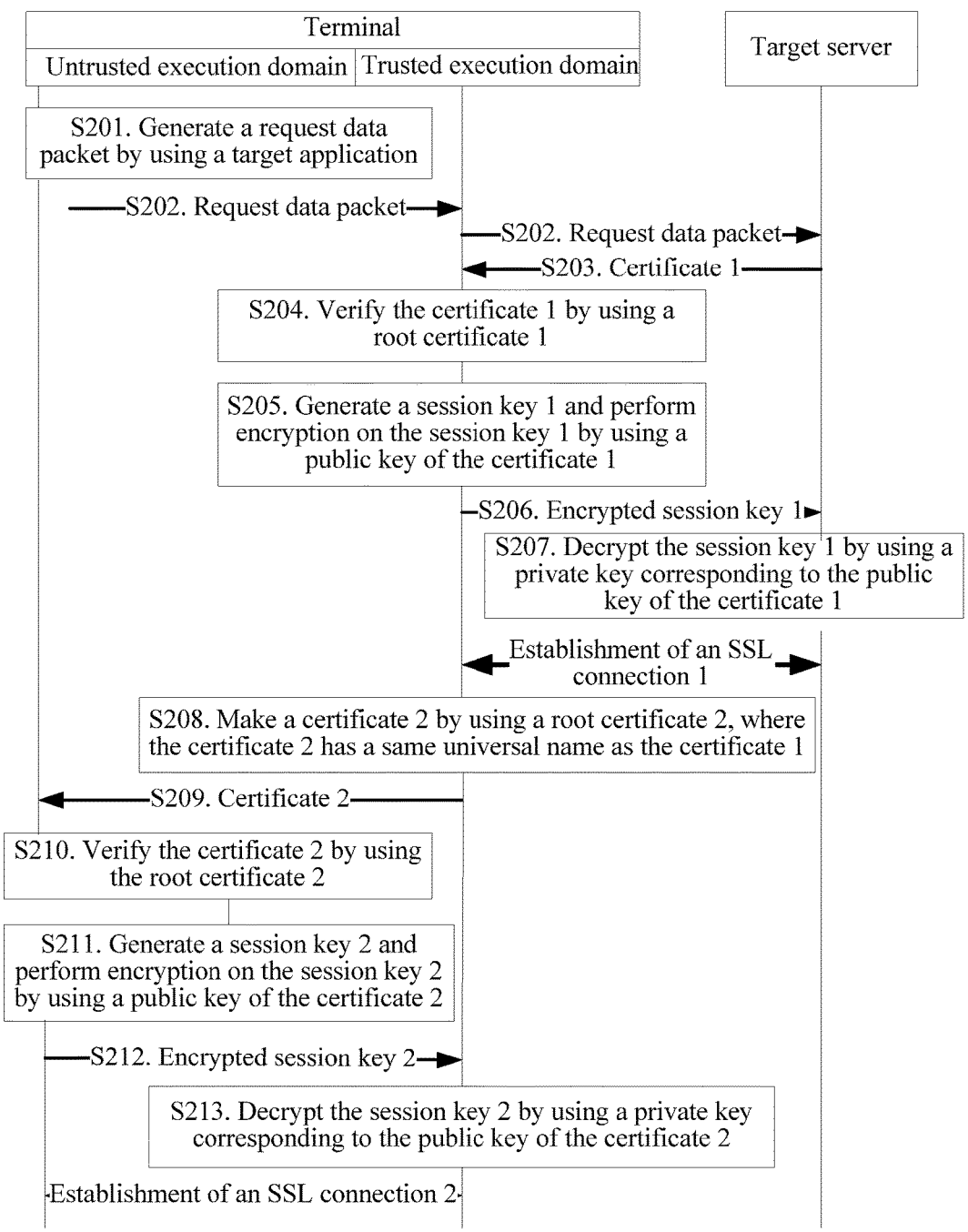
FIG. 3 shows another schematic flowchart of a data processing method according to an embodiment of the present invention.

As shown in FIG. 3, in step S201, a request data packet for requesting to establish an SSL connection with a target server is generated by using a target application that runs in an untrusted execution domain; in step S202, the request data packet is sent to the target server; in step S203, the target server sends, according to the request data packet, a certificate 1 (corresponding to a first certificate) that can certify an identity of the target server to a terminal. The certificate 1 includes a public key, a domain name of the server is used as a universal name of the certificate 1, signature information of the certificate 1 is encrypted by using a private key of a root certificate 1 (corresponding to a first root certificate), and the root certificate 1 (for example, the root certificate 1 in the SSL module 3 shown in FIG. 1) is pre-stored in a trusted execution domain of the terminal. In step S204, in the trusted execution domain, the certificate 1 sent by the server is verified by using the pre-stored root certificate 1. When it is determined that the signature information of the certificate 1 can be decrypted by using the public key of the root certificate 1, it indicates that the certificate 1 is a trusted certificate, that is, the target server is trusted; when it is determined that the universal name of the certificate 1 is consistent with the domain name of the server from which the target application expects to request a service, it may be determined that the target server is a server designated by the target application that runs in the untrusted execution domain. In step S205, when the verification on the identity of the target server succeeds, a session key 1 (corresponding to a first session key) is generated, and encryption is performed on the session key 1 by using the public key included in the certificate 1. In step S206, the encrypted session key 1 is sent to the server; and in step S207, the target server encrypts the session key 1 by using a private key corresponding to the public key included in the certificate 1. At this point, an SSL connection 1 (also corresponding to the SSL connection 1 shown in FIG. 1) between the terminal and the target server is implemented.

It should be understood that, in this embodiment of the present invention, the SSL connection with the target server is established in the trusted execution domain, and the session key 1 used for communication encryption is generated, that is, a terminal can learn the session key 1 determined by negotiation with the target server only when running in the trusted execution domain. In other words, a program and a system in the untrusted execution domain cannot acquire the session key 1. Therefore, in step S140, after encryption is performed, in the trusted execution domain and by using the first session key, on the second network data packet that includes the first data, the encrypted second network data packet can be decrypted only in the trusted execution domain and by the target server. In this case, an attacker cannot steal user privacy data because, first, it is impossible for the attacker to steal any data in the trusted execution domain, that is, it is impossible to steal the user privacy data stored in the trusted execution domain; second, the attacker cannot steal the user privacy data by forging a server, because the root certificate 1 that is used to verify the identity of the server is pre-stored in the trusted execution domain, and the attacker cannot tamper the root certificate 1. Therefore, only security authentication, in a trusted execution domain, on a trusted server can succeed. For a server forged by the attacker, security authentication definitely cannot succeed, that is, an SSL connection with the forged server fails, and negotiation with the forged server to determine the session key 1 cannot be performed, either. As a result, the attacker cannot steal the user privacy data in a plaintext format by forging a root certificate or a server.

Therefore, in this embodiment of the present invention, a plaintext form of the user privacy data (the first data) does not appear in the untrusted execution domain, which can effectively prevent an attacker from stealing the user privacy data in a plaintext format, thereby improving data security.

It should be understood that, in step S202, the request data packet is sent to the target server. The request data packet that is generated in the untrusted execution domain may be first transferred to the trusted execution domain by using the shared memory; then, in the trusted execution domain, the domain name of the server from which the target application expects to request a service is acquired according to the request data packet, so that in the subsequent step S204, the universal name of the certificate 1 is verified according to the domain name of the server; finally, the request data packet is sent to the target server. Optionally, the request data packet may be sent, in the trusted execution domain or the untrusted execution domain, to the target server, which is not limited in this embodiment of the present invention. For example, if a network driver that is used to send data to the server or receive data from the server is trusted and secure, that is, the network driver runs in the trusted execution domain, in step S202, the request data packet is sent, in the trusted execution domain, to the target server; if the network driver is untrusted, that is, the network drivers runs in the untrusted execution domain, in step S202, the request data packet is sent, in the untrusted execution domain, to the target server. It should be understood that, FIG. 3 involves an operation of data transmission by the server, for example, steps S202, S203, and S206 are all performed in the trusted execution domain, or are all performed in the untrusted execution domain. Specific implementation depends on an execution domain in which the network driver is located.

Specially, in the prior art, the network driver runs in the untrusted execution domain, as shown in FIG. 1. Therefore, in this embodiment of the present invention, if the network driver also runs in the untrusted execution domain, that is, the network driver performs, in the untrusted execution domain, communication transmission with the target server. An operation such as sending the request data packet to the target server, receiving the certificate 1 sent by the target server, sending the encrypted session key 1 to the target server, or sending the encrypted second network data packet to the target server, is performed in the untrusted execution domain. Compared with an existing architecture, a technical solution provided in this embodiment of the present invention is not modified greatly on the basis of improving data security, which can reduce a code modification cost.

Therefore, in the data processing method in this embodiment of the present invention, data is stored in a trusted execution domain, which prevents, during a process of using the data, data in a plaintext format from appearing in an untrusted execution domain, and can effectively prevent an attacker from stealing data, thereby improving data security.

As described in the foregoing with reference to FIG. 1, the target application that runs in the untrusted execution domain also verifies whether a server that performs communication with the target application is a server designated by the target application. In this embodiment of the present invention, the first network data packet that includes the first identifier and is generated by the target application is not directly sent to the server. Instead, the first network data packet is sent to the target server after the first network data packet is acquired in the trusted execution domain and processing is performed on the first network data packet (for example, replacing the first identifier with the first data). That is, in the present invention, it is the trusted execution domain (for example, the security module shown in FIG. 1) that directly communicates with the target application in the untrusted execution domain. Therefore, a certificate needs to be made in the trusted execution domain to implement establishment of an SSL connection between the trusted execution domain and the untrusted execution domain. Using the architecture shown in FIG. 1 as an example, it may be understood as follows. The target server designated by the application module establishes, in replacement of the security module in the trusted execution domain, an SSL connection with the application module.

Optionally, in an embodiment, before the acquiring a first network data packet that is sent by a target application that runs in an untrusted execution domain in step S110, the method further includes generating, in the trusted execution domain, a second certificate according to a second root certificate, where the second certificate has a same universal name as the first certificate, and the second root certificate is pre-stored in the trusted execution domain and the untrusted execution domain; and establishing the SSL connection between the trusted execution domain and the untrusted execution domain and determining a second session key according to the second certificate and the second root certificate, where the second session key is a session key between the trusted execution domain and the untrusted execution domain; where the acquiring, in a trusted execution domain, a first network data packet that is sent by a target application that runs in an untrusted execution domain includes acquiring the first network data packet that is encrypted by using the second session key; and decrypting, in the trusted execution domain, the encrypted first network data packet by using the second session key.

Optionally, in this embodiment of the present invention, the establishing the SSL connection between the trusted execution domain and the untrusted execution domain and determining a second session key according to the second certificate and the second root certificate includes acquiring the second certificate that is generated in the trusted execution domain; verifying, in the untrusted execution domain, the second certificate according to the second root certificate; generating the second session key when the verification succeeds, and encrypting the second session key by using a public key of the second certificate; and decrypting, in the trusted execution domain, the encrypted second session key by using a private key of the second certificate, to obtain the second session key.

As shown in FIG. 3, in step S208, in the trusted execution domain, after the verification on the identity of the target server succeeds, a certificate 2 (corresponding to the second certificate) is made by using a root certificate 2 (for example, the root certificate 2 in the SSL module 1 in the untrusted execution domain shown in FIG. 1) (corresponding to the second root certificate) that is pre-stored in the untrusted execution domain. That is, signature information of the certificate 2 is encrypted by using a private key of the root certificate 2. In addition, a universal name of the certificate 2 is the same as the universal name of the certificate 1 (referring to step S203) of the target server, and the certificate 2 also includes a public key, and a private key corresponding to the public key is stored in the trusted execution domain. In step S209, the certificate 2 is transferred to the untrusted execution domain by using a shared memory; in step S210, the certificate 2 is verified, in the untrusted execution domain, by using the root certificate 2. The public key of the root certificate 2 is used to decrypt the signature information of the certificate 2, and verify whether the universal name of the certificate 2 is a domain name of a server designated by the target application. In step S211, after the verification succeeds, a session key 2 (corresponding to the session key 1 in the SSL module 1 shown in FIG. 1) (corresponding to the second session key in this embodiment of the present invention) is generated in the untrusted execution domain, and encryption is performed on the session key 2 by using the public key of the certificate 2. In step S212, the encrypted session key 2 is transferred to the trusted execution domain by using a shared memory; and in step S213, the session key 2 is decrypted in the trusted execution domain by using the private key corresponding to the public key that is included in the certificate 2. At this point, an SSL connection 2 (corresponding to the SSL connection 2 shown in FIG. 1) is established between the untrusted execution domain and the trusted execution domain. In this case, the session key 2 used for communication encryption is known in the untrusted execution domain and the trusted execution domain. As shown in FIG. 1, the session key 2 is stored in both the SSL module 1 and the SSL module 2.

It should be understood that, in step S210, the certificate 2 is verified, in the untrusted execution domain, by using the root certificate 2. For the target application in the untrusted execution domain, the certificate 2 belongs to the target server of the target application (the universal name of the certificate 2 is consistent with the universal name of the certificate 1 that is provided by the target server). In addition, for the target application, the certificate 2 is a certificate issued by a trusted certificate authority (the certificate 2 is signed by using the root certificate 2 and the root certificate 2 is pre-installed in the untrusted execution domain; therefore, for the target application, the root certificate 2 belongs to a root certificate issued by the trusted certificate authority). Therefore, in step S210, verification, by using the root certificate 2, on the certificate 2 succeeds. Using FIG. 1 as an example, it may also be understood as including verification, by an application module, on an identity of a security module succeeds.

It should be further understood that, in this embodiment of the present invention, communication between the trusted execution domain and the untrusted execution domain may be implemented by using a shared memory, for example, in steps S209 and S212 shown in FIG. 3. Communication between the trusted execution domain and the untrusted execution domain may also be implemented in another manner, which is not limited in this embodiment of the present invention.

It should be further understood that the certificate 1, the root certificate 1, the certificate 2, and the root certificate 2 that are shown in FIG. 3 respectively correspond to the first certificate, the first root certificate, the second certificate, and the second root certificate in this embodiment of the present invention.

Therefore, in the data processing method in this embodiment of the present invention, an SSL connection with a target server is established in a trusted execution domain, and a communication key (a first session key) is generated between the target server and a security module. After first data is encrypted by using the communication key, the encrypted first data is sent to the target server, which can prevent the first data in a plaintext format from appearing in an untrusted execution domain, and can effectively prevent an attacker from stealing the first data, so that security of the first data can be effectively ensured during transmission, thereby further improving data security.

When the network data packet sent by the target server is received, the network data packet may also be sent to the target application that runs in the untrusted execution domain after related processing is performed, in the trusted execution domain, on the received network data packet.

Optionally, in an embodiment, the method 100 shown in FIG. 2 further includes receiving a third network data packet that is sent by the target server and is encrypted by using the first session key; decrypting, in the trusted execution domain, the encrypted third network data packet by using the first session key; generating a fourth network data packet according to the third network data packet and the first identifier that corresponds to the first data when it is determined that the decrypted third network data packet includes the first data, where the fourth network data packet does not include the first data; and sending the fourth network data packet to the target application that runs in the untrusted execution domain.

Optionally, in this embodiment of the present invention, the third network data packet is a response data packet that is used by the target server to respond to the second network data packet.

Figure 4:
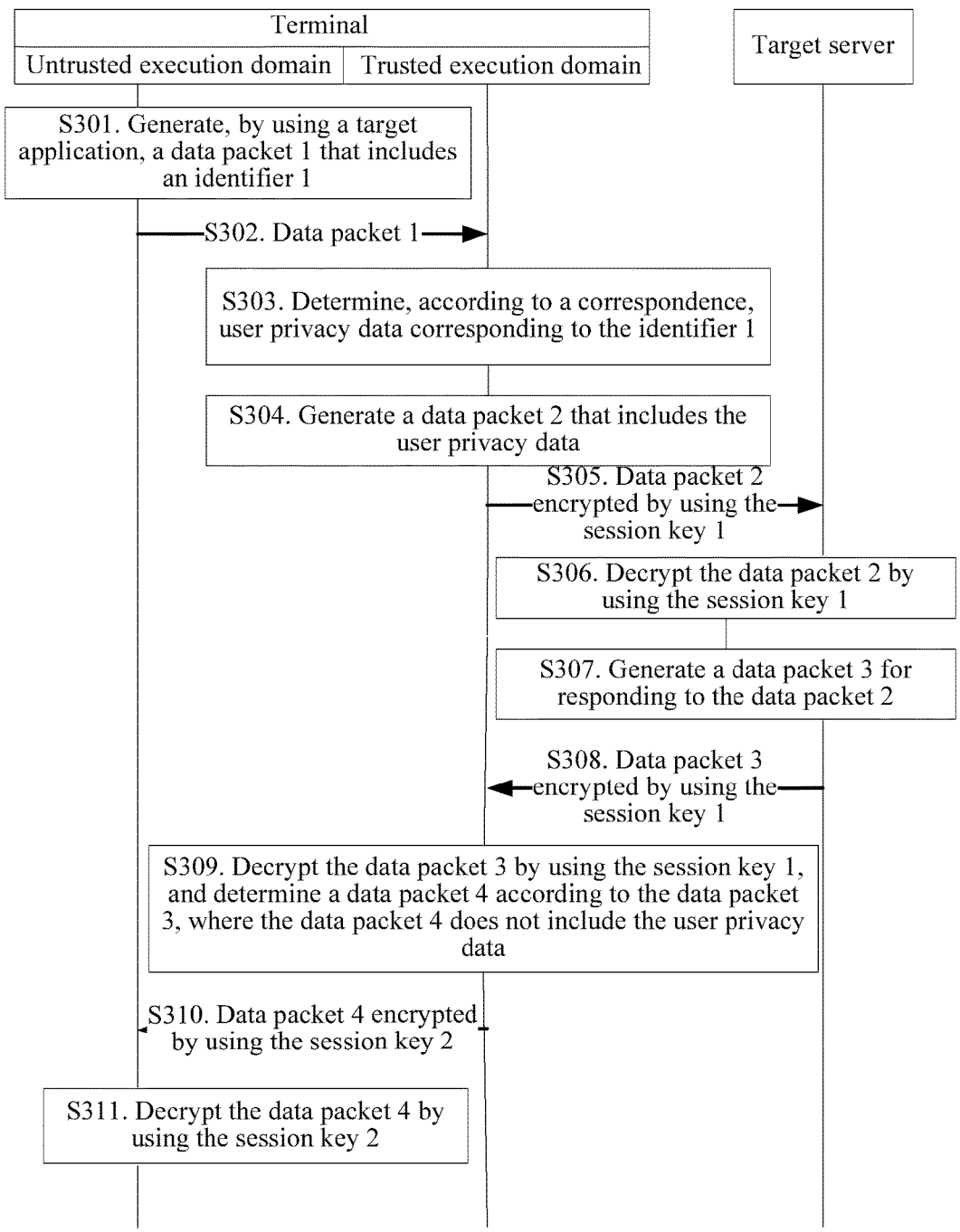
FIG. 4 shows still another schematic flowchart of a data processing method according to an embodiment of the present invention.

As shown in FIG. 4, in step S301, a data packet 1 (corresponding to a first network data packet) that includes an identifier 1 (corresponding to a first identifier) is generated by using a target application; in step S302, the data packet 1 is transferred to a trusted execution domain by using a shared memory; in step S303, corresponding user privacy data is determined in the trusted execution domain according to a correspondence and the identifier 1 that is in the data packet 1; in step S304, a data packet 2 (corresponding to a second network data packet) that includes the user privacy data is generated; in step S305, the data packet 2 that is encrypted by using a session key 1 (corresponding to a first session key) is sent to a target server; in step S306, the target server decrypts the data packet 2 by using a session key 2; in step S307, the target server determines a response packet, that is, a data packet 3 (corresponding to a third network data packet) according to the data packet 2; in step S308, the target server sends the data packet 3 that is encrypted by using the session key to a terminal; in step S309, the data packet 3 is decrypted in the trusted execution domain by using the session key 1 and a data packet 4 (corresponding to a fourth network data packet) that does not include the user privacy data is determined according to the data packet 3; in step S310, the data packet 4 that is encrypted by using the session key 2 (corresponding to a second session key) by using a shared memory; and in step S311, the data packet 4 is decrypted in the untrusted execution domain by using the session key 2, so that the target application uses data in the data packet 4 to implement a corresponding application operation. For example, after a WeChat application receives a response of a WeChat application server, a login operation of a user can be implemented. For another example, after an Alipay application receives a response of an Alipay application server, a payment operation, a login operation, or the like of a user may be implemented.

It should be understood that, in step S309, the data packet 4 that does not include the user privacy data is determined in the trusted execution domain according to the data packet 3. When it is determined that the data packet 3 does not include the user privacy data, it may be directly determined that the data packet 3 is the data packet 4. In other words, the data packet 3 may be directly transferred to the untrusted execution domain. When it is determined that the data packet 3 includes the user privacy data, the data packet 4 may be determined by replacing the user privacy data in the data packet 3 with the first identifier.

Optionally, in this embodiment of the present invention, when it is determined that the third network data packet does not include first data, it is determined that the third network data packet is the fourth network data packet.

Therefore, in the data processing method in this embodiment of the present invention, data is stored in a trusted execution domain of a terminal, and data in a plaintext format is prevented, during a process of using the data, from being exposed in an untrusted execution domain of the terminal, which can effectively prevent an attacker from stealing the data, thereby effectively improving security of the data in the terminal.

In addition, compared with the prior art in which user privacy data is stored in an application (that is, in an untrusted execution domain), in the data processing method in this embodiment of the present invention, user privacy data is stored in a trusted execution domain of a terminal, and an identifier of the user privacy data is stored in an untrusted execution domain, which improves security of the user privacy data but does not significantly increase a performance overhead of the terminal. In addition, a root certificate that is used to verify a server is stored in the trusted execution domain, which effectively verifies an identity of the server and effectively prevents an attack from a malicious server.

For easier understanding of the data processing method in this embodiment of the present invention, the following briefly describes implementation of this embodiment of the present invention with reference to the structure shown in FIG. 1 and by using a mobile bank and credit card payment as an example.

A mobile bank is used as a first example, that is, the terminal shown in FIG. 1 is a mobile phone, the application module in the untrusted execution domain is the mobile bank, and the application server is a mobile bank server. Initially, an SSL connection is established between the mobile bank and the security module, and between the security module and the mobile bank server, where the trusted SSL module 3 is used to verify an identity of the mobile bank server. For example, when a user performs a login operation on the mobile bank server, the mobile bank may read a first identifier of stored user privacy data (including an account and a password), the first identifier and other information are used to generate a first network data packet that is used to request a login service from the mobile bank server, and the first network data packet is encrypted by the SSL module 1 by using the session key 2. The security module receives the first network data packet that is obtained by decryption by the SSL module 2 and is forwarded by the proxy module 1, the shared memory, and the proxy module 2, replaces the first identifier inside with the user privacy data (including the account and the password), and generates a second network data packet. The SSL module 3 performs encryption on the second network data packet by the SSL module 3 by using the session key 1, then the encrypted second network data packet is sent to the mobile bank server by using the proxy module 2, the shared memory, the proxy module 1, and the network driver. The mobile bank server processes a request of the second network data packet, determines a third network data packet that is used to respond to the request, and sends the third network data packet that is encrypted by using the session key 1 to the mobile phone. The third network data packet is decrypted by the SSL module 3 in the trusted execution domain. In the trusted execution domain, a fourth network data packet that does not include the user privacy data is sent to the mobile bank by using the security module, the SSL module 2, the proxy module 1, the shared memory, and the proxy module 2.

During a process of using the mobile bank, the user privacy data (including the account and the password) in a plaintext format is never exposed to the untrusted execution domain, which can effectively ensure security of the password and the account of the mobile bank of the user. In addition, a secure root certificate stored in the trusted execution domain is used to verify authenticity of the mobile bank server, and therefore a maliciously forged mobile bank server can be identified, thereby further improving security of the user privacy data.

Credit card payment is used as a second example, that is, the terminal shown in FIG. 1 is a mobile phone, the application module in the untrusted execution domain is a credit card application module, and the application server is a credit card application server.

When the credit card application module sends a first identifier (a credit card number) of user privacy data to the credit card application server to perform an operation such as payment. In the trusted execution domain, the credit card application module may replace the first identifier with the user privacy data (the credit card number), and then sends the user privacy data to the credit card application server. This can protect security of the credit card number of a user, to prevent a malicious program from stealing the credit card number of the user. The description is similar to the example of the mobile bank, and for brevity, details are not described herein again.

Therefore, in the data processing method in this embodiment of the present invention, user privacy data is stored in a trusted execution domain, which can effectively prevent, during a process of using the user privacy data, a plaintext form of the user privacy data from appearing in an untrusted execution domain, and can effectively prevent an attacker from stealing the user privacy data, thereby improving security of the user privacy data.

A manner of attacking user privacy data that can be resisted in the data processing method in this embodiment of the present invention includes but is not limited to the following embodiments. 1. Use an application vulnerability to acquire user privacy data stored in an application. 2. Use a system vulnerability to acquire user privacy data encrypted by an application. In consideration of performance, an application generally only performs simple encryption on the user privacy data and then stores the user privacy data, which is easily cracked. 3. Use a malicious untrusted encrypting/decrypting module (for example, an encrypting module in an untrusted execution domain, for example, the SSL module 1 in FIG. 1) to obtain all data in a plaintext format that is sent/received by an application, to obtain the user privacy data.

In this embodiment of the present invention, the user privacy data in a plaintext format does not appear in the untrusted execution domain, and therefore, the user privacy data cannot be acquired by launching an above-mentioned attack directly on the user privacy data. The user privacy data only appears in the untrusted execution domain after encryption by a trusted encrypting module (for example, an encrypting module in a trusted execution domain, for example, the SSL module 3 in FIG. 1). However, a cost of brute force cracking, based on a current technology, on information that is encrypted by using a trusted encryption protocol (such as the SSL protocol) is high, and such an attack manner does not need to be considered.

The data processing method in this embodiment of the present invention may further resist an attack on a terminal that is implemented by installing a malicious root certificate on the terminal by an attacker.

1. The attacker installs a malicious root certificate in a mobile phone; in this case, the root certificate may be used to forge a malicious server as a target server of a target application, to obtain all data in a plaintext format that is sent by a user.

In this embodiment of the present invention, a root certificate stored in a trusted execution domain is used to verify an identity of a server, and an attacker cannot install any malicious root certificate in the trusted execution domain, and therefore, user privacy data in a terminal cannot be attacked by installing a malicious root certificate.

2. When installing a malicious root certificate, an attacker may attack an untrusted proxy so that the untrusted proxy does not use any function of a trusted execution domain.

If the trusted execution domain is bypassed, the attacker may steal all information sent by an application. However, all data sent by an application is merely an identifier, and there is no association, in view of content, between the identifier and user privacy data corresponding to the identifier; therefore, the attacker cannot acquire any user privacy data of a user.

Therefore, in the data processing method in this embodiment of the present invention, user privacy data is stored in a trusted execution domain of a terminal, and a plaintext form of the user privacy data is prevented, during a process of using the user privacy data, from being exposed in an untrusted execution domain of the terminal, which can effectively prevent an attacker from stealing the user privacy data, thereby effectively protecting security of the user privacy data in the terminal.

It should be understood that the data processing method in this embodiment of the present invention may further be applied to a scenario of protecting very important data that needs to be modified at any time, for example, an order amount. For example, an input and display module may be added to the trusted execution domain, and information related to the order amount may be saved into the trusted execution domain, for example, into the security module in the trusted execution domain in a processing manner same as or similar to that of the user privacy data, which can effectively prevent order information from being tampered.

It should be understood that in various embodiments of the present invention, a value of a sequence number in the foregoing processes does not indicate an execution sequence, and an execution sequence of each process is determined by its function and internal logic, which shall not constitute any limitation to an implementation process of an embodiment of the present invention.

Therefore, in the data processing method in this embodiment of the present invention, user privacy data is stored in a trusted execution domain, which can effectively prevent, during a process of using the user privacy data, a plaintext form of the user privacy data from appearing in an untrusted execution domain, and can effectively prevent an attacker from stealing the user privacy data, thereby improving security of the user privacy data.

The foregoing describes in detail a data processing method according to the embodiments of the present invention with reference to FIG. 1 to FIG. 4. The following describes in detail a data processing apparatus according to the embodiments of the present invention with reference to FIG. 5.

Figure 5:
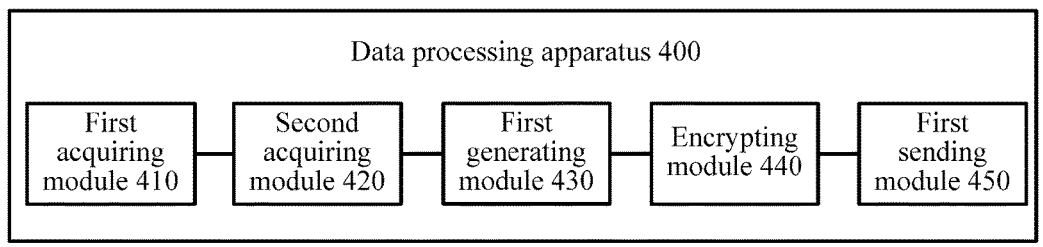
FIG. 5 shows a schematic block diagram of a data processing apparatus according to an embodiment of the present invention.

FIG. 5 shows a schematic block diagram of a data processing apparatus 400 according to an embodiment of the present invention. As shown in FIG. 5, the apparatus includes a first acquiring module 410 configured to acquire a first network data packet that is sent by a target application that runs in an untrusted execution domain, where the first network data packet includes a first identifier; a second acquiring module 420 configured to acquire, in a trusted execution domain, first data corresponding to the first identifier in the first network data packet that is acquired by the first acquiring module 410, where the first data is data necessary for requesting, by the target application, a service from a target server; a first generating module 430 configured to generate, in the trusted execution domain, a second network data packet according to the first network data packet and the first data that is acquired by the second acquiring module 420; an encrypting module 440 configured to perform, in the trusted execution domain and by using a first session key that is determined by pre-negotiation with the target server, encryption on the second network data packet that is generated by the first generating module 430, to acquire an encrypted second network data packet; and a first sending module 450 configured to send the encrypted second network data packet that is acquired by the encrypting module 440 to the target server.

Therefore, by using the data processing apparatus of this embodiment of the present invention, data is stored in a trusted execution domain, and a data encryption key is also stored in the trusted execution domain, which can improve data security.

Optionally, in an embodiment, the apparatus further includes a receiving module configured to receive a third network data packet that is sent by the target server and is encrypted by using the first session key; a processing module configured to decrypt, in the trusted execution domain and by using the first session key, the encrypted third network data packet that is received by the receiving module; generate a fourth network data packet according to the third network data packet and the first identifier that corresponds to the first data when it is determined that the decrypted third network data packet includes the first data, where the fourth network data packet does not include the first data; and a second sending module configured to send the fourth network data packet that is generated by the processing module to the target application that runs in the untrusted execution domain.

Optionally, in an embodiment, the apparatus further includes a first establishing module configured to establish, in the trusted execution domain, a SSL connection with the target server before the first acquiring module 410 acquires the first network data packet that is sent by the target application that runs in the untrusted execution domain, and determine the first session key, where the first session key is a session key generated after verification, by using a first root certificate that is pre-stored in the trusted execution domain, on a first certificate of the target server succeeds, where the first certificate is used to certify an identity of the target server.

Optionally, in an embodiment, the apparatus includes a second generating module configured to generate, in the trusted execution domain, a second certificate according to a second root certificate before the first acquiring module 410 acquires the first network data packet that is sent by the target application that runs in the untrusted execution domain, where the second certificate has a same universal name as the first certificate, and the second root certificate is pre-stored in the trusted execution domain and the untrusted execution domain; and a second establishing module configured to establish, according to the second root certificate and the second certificate that is generated by the second generating module, the SSL connection between the trusted execution domain and the untrusted execution domain, and determine a second session key, where the second session key is a session key between the trusted execution domain and the untrusted execution domain; the first acquiring module 410 includes a first acquiring unit configured to acquire the first network data packet that is encrypted by using the second session key; and a decrypting unit configured to decrypt, in the trusted execution domain and by using the second session key, the encrypted first network data packet that is acquired by the first acquiring unit.

Optionally, in an embodiment, the second establishing module includes a second acquiring unit configured to acquire the second certificate that is generated in the trusted execution domain; a processing unit configured to verify, in the untrusted execution domain and according to the second root certificate, the second certificate that is acquired by the second acquiring unit; generate the second session key when the verification succeeds, and encrypt the second session key by using a public key of the second certificate; and a decrypting unit configured to decrypt, in the trusted execution domain and by using a private key of the second certificate, the second session key that is encrypted by the processing unit, to obtain the second session key.

Optionally, in an embodiment, the first sending module includes a transferring unit configured to transfer the encrypted second network data packet to the untrusted execution domain by using a shared memory; and a sending unit configured to send, in the untrusted execution domain, the encrypted second network data packet to the target server.

It should be understood that, the data processing apparatus 400 according to this embodiment of the present invention may correspond to a terminal in a data processing method in the embodiments of the present invention, for example, the terminal shown in FIG. 1, and the foregoing and other operations and/or functions of the modules in the apparatus 400 are respectively used to implement the corresponding procedures of the methods in FIG. 1 to FIG. 4, which are not described herein again for brevity.

Therefore, by using the data processing apparatus of this embodiment of the present invention, data is stored in a trusted execution domain, and a data encryption key is also stored in the trusted execution domain, which can improve data security.

Figure 6:
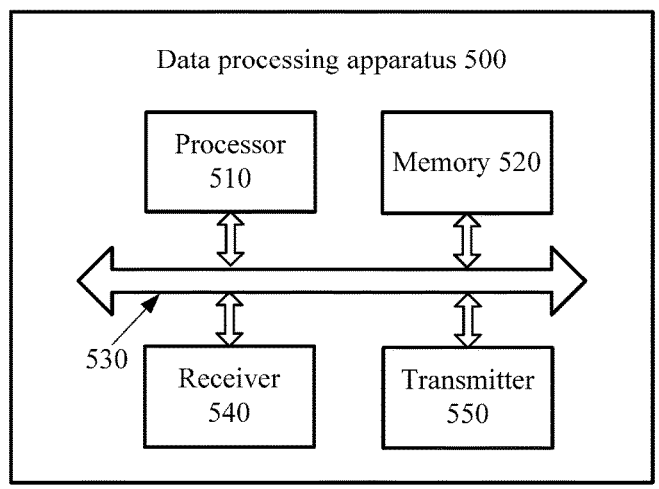
FIG. 6 shows a schematic block diagram of a data processing apparatus according to another embodiment of the present invention.

As shown in FIG. 6, an embodiment of the present invention further provides a network device 500, where the network device 500 includes a processor 510, a memory 520, a bus system 530, a receiver 540, and a transmitter 550. The processor 510, the memory 520, the receiver 540, and the transmitter 550 are connected by using the bus system 530, the memory 520 is configured to store an instruction, and the processor 510 is configured to execute the instruction stored by the memory 520, to control the receiver 540 to receive a signal and control the transmitter 550 to send a signal. The processor 510 is configured to acquire a first network data packet that is sent by a target application that runs in an untrusted execution domain, where the first network data packet includes a first identifier; acquire, in a trusted execution domain, first data corresponding to the first identifier, where the first data is data necessary for requesting, by the target application, a service from a target server; generate, in the trusted execution domain, a second network data packet according to the first network data packet and the first data that is acquired by a second acquiring module; perform, in the trusted execution domain and by using a first session key that is determined by pre-negotiation with the target server, encryption on the second network data packet that is generated by a first generating module, to acquire an encrypted second network data packet; and the transmitter 550 is configured to send the encrypted second network data packet that is acquired by an encrypting module to the target server.

Therefore, by using the data processing apparatus of this embodiment of the present invention, data is stored in a trusted execution domain, and a data encryption key is also stored in the trusted execution domain, which can improve data security.

Optionally, in an embodiment, the receiver 540 is configured to receive a third network data packet that is sent by the target server and is encrypted by using the first session key; the processor 510 is configured to decrypt, in the trusted execution domain and by using the first session key, the encrypted third network data packet that is received by the receiver 540; generate a fourth network data packet according to the third network data packet and the first identifier that corresponds to the first data when it is determined that the decrypted third network data packet includes the first data, where the fourth network data packet does not include the first data; the transmitter 550 is configured to send the fourth network data packet to the target application that runs in the untrusted execution domain.

Optionally, in an embodiment, the processor 510 is configured to establish, in the trusted execution domain, a SSL connection with the target server before acquiring the first network data packet that is sent by the target application that runs in the untrusted execution domain, and determine the first session key, where the first session key is a session key generated after verification, by using a first root certificate that is pre-stored in the trusted execution domain, on a first certificate of the target server succeeds, where the first certificate is used to certify an identity of the target server.

Optionally, in an embodiment, the processor 510 is configured to generate, in the trusted execution domain, a second certificate according to a second root certificate before acquiring the first network data packet that is sent by the target application that runs in the untrusted execution domain, where the second certificate has a same universal name as the first certificate, and the second root certificate is pre-stored in the trusted execution domain and the untrusted execution domain; establish, according to the second root certificate and the second certificate that is generated by a second generating module, the SSL connection between the trusted execution domain and the untrusted execution domain, and determine a second session key, where the second session key is a session key between the trusted execution domain and the untrusted execution domain; acquire the first network data packet that is encrypted by using the second session key; and decrypt, in the trusted execution domain and by using the second session key, the encrypted first network data packet.

Optionally, in an embodiment, the processor 510 is configured to acquire the second certificate that is generated in the trusted execution domain; verify, in the untrusted execution domain, the second certificate according to the second root certificate; generate the second session key when the verification succeeds, and encrypt the second session key by using a public key of the second certificate; and decrypt, in the trusted execution domain and by using a private key of the second certificate, the second session key that is encrypted by a processing unit, to obtain the second session key.

Optionally, in an embodiment, the processor 510 is configured to transfer the encrypted second network data packet to the untrusted execution domain by using a shared memory.

The transmitter 550 is configured to send, in the untrusted execution domain, the encrypted second network data packet to the target server.

It should be understood that, in this embodiment of the present invention, the processor 510 may be a central processing unit (CPU), or the processor 510 may be another general purpose processor, a digital signal processor (DSP), an application-specific integrated circuit (ASIC), a field-programmable gate array (FPGA) or another programmable logical device, a discrete gate or a transistor logic device, a discrete hardware component, or the like. The general purpose processor may be a microprocessor or the processor may be any conventional processor.

The memory 520 may include a read-only memory and a random access memory, and provides an instruction and data for the processor 510. A part of the memory 520 may further include a non-volatile random access memory (NVRAM). For example, the memory 520 may further store information about device types.

In addition to a data bus, the bus system 530 may further include a power bus, a control bus, a status signal bus, and the like. However, for clear description, various types of buses in the figure are marked as the bus system 530.

During an implementation process, steps in the foregoing methods may be completed by using an integrated logic circuit of hardware in the processor 510 or an instruction in a form of software. Steps of the methods disclosed with reference to the embodiments of the present invention may be directly executed and completed by a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 520, and the processor 510 reads information in the memory 520 and completes the steps in the foregoing methods in combination with hardware of the processor 510. To avoid repetition, details are not described herein again.

It should further be understood that, the data processing apparatus 500 according to this embodiment of the present invention may correspond to the data processing apparatus 400 in the embodiment of the present invention, or may correspond to a data processing terminal in an embodiment of the present invention, and the foregoing and other operations and/or functions of the modules in the apparatus 500 are respectively used to implement the corresponding procedures of the methods of FIG. 1 to FIG. 4, and are not described herein again for brevity.

Therefore, by using the data processing apparatus of this embodiment of the present invention, data is stored in a trusted execution domain, and a data encryption key is also stored in the trusted execution domain, which can improve data security.

The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that in various embodiments of the present invention, a value of a sequence number in the foregoing processes does not indicate an execution sequence, and an execution sequence of each process is determined by its function and internal logic, which shall not constitute any limitation to an implementation process of an embodiment of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely exemplary implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data processing method for a data processing apparatus in communication with a target server, comprising:
   acquiring, by the data processing apparatus, an encrypted first network data packet that is encrypted by using a second session key;
   decrypting, by the data processing apparatus, in a trusted execution domain operated on a processor of the data processing apparatus, the encrypted first network data packet by using the second session key into a decrypted first network data packet comprising a first identifier;
   acquiring, by the data processing apparatus, in the trusted execution domain, first data corresponding to the first identifier, wherein the first data is data necessary for requesting, by a target application, the service from a target server;
   generating, by the data processing apparatus, in the trusted execution domain, a second network data packet according to the first data and the decrypted first network data packet;
   performing, by the data processing apparatus, in the trusted execution domain, encryption on the second network data packet by using a first session key that is determined by pre-negotiation with the target server, to acquire an encrypted second network data packet;
   sending by the data processing apparatus, the encrypted second network data packet to the target server;
   receiving an encrypted third network data packet that is sent by the target server and is encrypted using the first session key;
   decrypting, in the trusted execution domain, the encrypted third network data packet using the first session key to generate a decrypted third network data packet;
   generating a fourth network data packet according to the third network data packet and the first identifier that corresponds to the first data when it is determined that the decrypted third network data packet comprises the first data, wherein the fourth network data packet does not comprise the first data; and
   sending the fourth network data packet to the target application that runs in a untrusted execution domain.

2. The method according to claim 1, wherein the sending the encrypted second network data packet to the target server comprises:
   transferring the encrypted second network data packet to the untrusted execution domain by using a shared memory; and
   sending, in the untrusted execution domain, the encrypted second network data packet to the target server.

3. The method according to claim 1, further comprising:
   sending a request data packet to the target server;
   receiving a first certificate and verifying the first certificate by using a first root certificate that is pre-stored in the trusted execution domain, wherein the first certificate is used to certify an identity of the target server; and
   determining a first session key when the verification succeeds.

4. The method according to claim 1, further comprising:
   generating, in the trusted execution domain, a second certificate according to a second root certificate, wherein the second certificate has a same universal name as the first certificate, and the second root certificate is pre-stored in the trusted execution domain and the untrusted execution domain; and determining a second session key according to the second certificate and the second root certificate, wherein the second session key is a session key between the trusted execution domain and the untrusted execution domain.

5. A data processing apparatus, comprising:

a processor; and a non-transitory media readable by the processor, the non-transitory media storing instructions that when executed by the processor, cause the processor to:

acquire an encrypted first network data packet that is encrypted by using a second session key;

decrypt, in a trusted execution domain, the encrypted first network data packet by using the second session key into a decrypted first network data packet comprising a first identifier;

acquire, in the trusted execution domain, first data corresponding to the first identifier, wherein the first data is data necessary for requesting, by a target application, a service from a target server;

generate, in the trusted execution domain, a second network data packet according to the first data and the decrypted first network data packet;

perform, in the trusted execution domain, encryption on the second network data packet by using a first session key that is determined by pre-negotiation with the target server, to acquire an encrypted second network data packet;

send the encrypted second network data packet to the target server;

receive an encrypted third network data packet that is sent by the target server and is encrypted using the first session key;

decrypt, in the trusted execution domain, the encrypted third network data packet using the first session key to generate a decrypted third network data packet;

generate a fourth network data packet according to the third network data packet and the first identifier that corresponds to the first data when it is determined that the decrypted third network data packet comprises the first data, wherein the fourth network data packet does not comprise the first data; and send the fourth network data packet to the target application that runs in a untrusted execution domain.

6. The apparatus according to claim 5, wherein the instructions for directing the processor to:

transfer the encrypted second network data packet to the untrusted execution domain by using a shared memory; and send, in the untrusted execution domain, the encrypted second network data packet to the target server.

7. The apparatus according to claim 5, wherein the instructions for directing the processor to:

send a request data packet to the target server;

receive a first certificate and verify the first certificate by using a first root certificate that is pre-stored in the trusted execution domain, wherein the first certificate is used to certify an identity of the target server; and determine a first session key when the verification succeeds.

8. The apparatus according to claim 5, wherein the instructions for directing the processor to:

generate, in the trusted execution domain, a second certificate according to a second root certificate, wherein the second certificate has a same universal name as the first certificate, and the second root certificate is pre-stored in the trusted execution domain and the untrusted execution domain; and determine a second session key according to the second certificate and the second root certificate, wherein the second session key is a session key between the trusted execution domain and the untrusted execution domain.

* * * * *